United States Patent Office 3,573,006
Patented Mar. 30, 1971

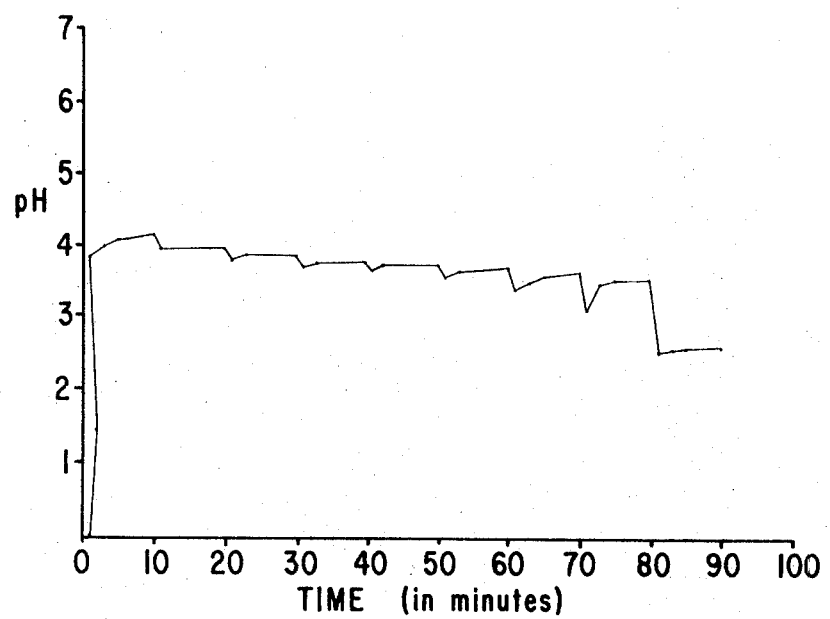

3,573,006
POLYMERIC ALUMINUM MAGNESIUM HYDROXY BUFFER COMPLEXES
I-Kao Shih and Eric Blaser, Toronto, Ontario, Canada, assignors to Warner-Lambert Pharmaceutical Company, Morris Plains, N.J.
Filed June 19, 1968, Ser. No. 738,312
Int. Cl. A01n 11/00; C01f 7/74; C07f 1/08
U.S. Cl. 23—315                    8 Claims

ABSTRACT OF THE DISCLOSURE

Complexes containing as cations aluminum and magnesium ionically bound with anions other than hydroxyl which are capable of neutralizing large quantities of acid rapidly to a pH of about 4 and capable of buffering at said pH over long periods of time. These complexes are useful in the treatment of gastric hyperacidity.

---

This invention relates to novel buffer complexes having a unit structure containing as cations, aluminum and magnesium ionically bound with anions other than hydroxyl, which are capable of neutralizing large quantities of acid to a pH of about 4 and capable of buffering this pH over long periods of time. These complexes are useful in the treatment of gastric hyperacidity.

This invention also describes a generalized process which can be adapted to prepare complexes containing aluminum and magnesium, ionically bound with anions other than hydroxyl having definite physical as well as chemical structures.

Broadly speaking, the novel complexes of this invention are prepared by mixing an aqueous solution of an alkali metal aluminate with a solution of a magnesium salt under specific reaction conditions as described below.

The complexes of this invention may be represented by the following structural formula:

$$[2Al(OH)_3 \cdot M(OH)_2]_n \cdot [xM(OH)_2 \cdot yMA]_{n-1}$$

wherein M represents bivalent metal cations, for example, magnesium, cobalt, copper, zinc, ferrous and the like; $n$ represents the degree of polymerization; $x$ and $y$ represent moles of anion complexing with the bivalent metal cations; $x+y=1$; and A represents anions, for example, halides, sulfate, nitrate, carbonate, salicylate, and the like.

Exemplary of the novel complexes which are disclosed in this application are:

where M is Mg and $n$ is 2:

(1)  $[2 Al(OH)_3 \cdot Mg(OH)_2]_2 \cdot$
     $[0.5 Mg(OH)_2 \cdot 0.5 Mg Cl_2]$
(2)  $[2 Al(OH)_3 \cdot Mg(OH)_2]_2 \cdot$
     $[0.15 Mg(OH)_2 \cdot 0.85 Mg SO_4]$
(3)  $[2 Al(OH)_3 \cdot Mg(OH_2]_2 \cdot$
     $[0.63 Mg(OH)_2 \cdot 0.37 Mg(C_6H_4(OH) CO_2)]$
(4)  $[2 Al(OH)_3 \cdot Mg(OH)_2]_2 \cdot$
     $[0.33 Mg(OH)_2 \cdot 0.67 MgCO_3]$
(5)  $[ Al(OH)_3 \cdot Mg(OH)_2]_2 \cdot$
     $[0.80 Mg(OH)_2 \cdot 0.20 Mg NO_3]$ where M is cobalt and $n$ is 2:

$[2 Al(OH)_3 \cdot Co(OH)_2]_2 \cdot [0.25 Co(OH)_2 \cdot 0.75 CoCl_2]$ where M is copper and $n$ is 50 or larger:

$[2 Al(OH)_3 \cdot Cu(OH)_2]_{50} \cdot [0.20 Cu(OH)_2 \cdot 0.80 CuSO_4]_{49}$

The complexes of this invention are useful to relieve gastric hyperacidity in mammals. Generally, an oral dose of 0.1 to 0.5 gram, 2 to 3 times daily, is recommended. Of course, this dosage regimen may be varied according to weight, age, sex, and severity of the condition being treated according to methods well known to the healing art.

Broadly speaking, the complexes of this invention are prepared by reacting an alkali metal aluminate with a solution containing the stelected bivalent metal salt, for example, magnesium sulfate, ferrous sulfate, copper sulfate, zinc chloride and the like at a pH of about 11.2. This pH is very critical to the production of the desired complexes of this invention. Thus, when the pH is above 11.2, only mixtures of aluminum and magnesium hydroxides are formed. On the other hand, when a pH is significantly below 10, the reaction does not take place at all. The reaction can generally be carried out at room temperature, that is, a range of about 20 to 30° C. The products are formed as precipitates and can be readily recovered by filtration.

The alkali metal aluminate solution may be prepared by dissolving an aluminum salt, such as aluminum chloride or aluminum sulfate in water and slowly adding a stoichiometric amount of sodium hydroxide solution to obtain the desired aluminate solution.

In practice, the alkali metal aluminate solution is prepared by mixing 0.5 mole of aluminum salt and 2 moles of an alkali metal hydroxide in water. The selected bivalent metal salt is then added to the alkali metal aluminate solution thus formed.

The bivalent metal salt solution may be any water soluble bivalent metal salt, for example, magnesium chloride, magnesium sulfate, magnesium acetate, magnesium nitrate, ferrous sulfate, zinc sulfate, copper sulfate and the like.

A novel feature of this invention is the discovery of a specific reaction mechanism through which the aluminum solution and a bivalent metal solution may be reacted together with a source of an anion other than hydroxyl common to the bivalent salt to produce a polymeric bivalent complex of double hydroxides of aluminum and the metal ion. For example, the following general reaction mechanism may be set forth to represent the reaction leading to the formation of one of the novel products of this invention:

STEP 1

$$Al^{+3} + 3OH^- \rightleftharpoons Al(OH)_3$$
$$Al(OH)_3 + OH^- \rightleftharpoons Al(OH)_4^-$$

Step 2

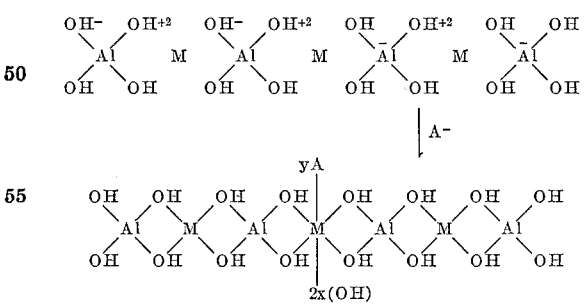

wherein M and A are as defined. The above described process is remarkable because the final products are formed instantaneously and the anions are ionically bound to the aluminum magnesium double hydroxide.

The complexes of this invention exhibit outstanding buffering capacity and are capable of buffering at a pH of 4 over long periods of time.

Referring now more specifically to the accompanying diagram, it is a graph employing the Holbert method, J. Am. Pharm. Assn., Scientific Edition, vol. 36, page 149 (1947), for the determination of the acid combining activity of an acid.

Briefly, the procedure is as follows: into a beaker fitted with a stirring device containing about 1000 ml. of water is charged 150 ml. of simulated gastric juice, U.S.P. XVI. The mixture is then mixed, warmed to 37 to 38° C. and maintained at that temperature during the test. To this is added with stirring 2 g. of the aluminum magnesium complex of this invention. When the addition of this complex is complete the pH is determined. The mixture is allowed to stir for 10 minutes after which the pH is again determined. 20 ml. of the mixture is then withdrawn and replaced by 20 ml. of fresh simulated gastric juice. This procedure is repeated at 10 minute intervals for 90 minutes. The curve is obtained by plotting time in minutes against pH. It is evident from the curve that the complex of this invention has a remarkable buffering capacity by maintaining the pH of the medium at about 4 for a period of about 90 minutes.

A further feature of this invention resides in the discovery that the present process can be adapted to prepare double hydroxides of aluminum and magnesium containing an ionically bound anion other than that which is common to the magnesium salt. Such compounds can be prepared by adding a solution containing the desired anion to the aluminate solution before reacting it with the magnesium solution. Thus, for example, addition of a solution of sodium salicylate of the formula:

$$C_6H_5(OH)COONa$$

to the sodium aluminate solution prior to the addition of the magnesium solution results in a formation of a product having the formula:

$$[4Al(OH)_3 \cdot 2Mg(OH)_2 \cdot Mg(C_6H_5(OH)(CO_2)_2]_{37.5\%}$$

$$[4Al(OH)_3 \cdot 2Mg(OH)_2 \cdot Mg(OH)_2]_{62.5\%}$$

This composition exhibits analgesic as well as antacid properties when used to treat gastric hyperacidity.

Similarly, a double hydroxide of aluminum and magnesium may be produced having a polyvalent anion ionically bound to it. Thus, for example, magnesium carbonate may be reacted with the aluminate solution to prepare a complex of double hydroxides of aluminum and magnesium having the following formula:

$$[4Al(OH)_3 \cdot 2Mg(OH)_2 \cdot MgCO_3]_{66.7\%}$$

$$[4Al(OH)_3 \cdot 2Mg(OH)_2 \cdot Mg(OH)]_{33.3\%}$$

The following examples are included in order further to illustrate the invention:

EXAMPLE 1

Addition of solution of magnesium salt to sodium aluminate solution containing anion common to the magnesium salt (A) Magnesium chloride complex of double hydroxides of aluminum and magnesium.—121 gm. of aluminum chloride, $AlCl_3 \cdot 6H_2O$, (0.5 mole) was dissolved in 0.5 liter of water. The aluminum solution was then added slowly to 1.5 liter of sodium hydroxide solution, in which 80 gm. of sodium hydroxide (2 moles) were dissolved. The aluminate solution was filtered and allowed to cool down to room temperature, 25–30° C. (In practice filtration of sodium aluminate solution may not be necessary.) The pH of the aluminate solution was around 11.2. To the aluminate solution, 0.35 liter of magnesium chloride solution was slowly and continuously added with mixing (magnesium chloride solution was made of 71 gm. of magnesium chloride hexahydrate in 0.35 liter of water). The final pH of the reaction system was 8.6. The product was filtered and washed three times each with approximately two liters of water. Semi-transparent substance was obtained after drying. The product has the following unique composition:

$$2Al_2O_3 \cdot 3MgO \cdot Cl \cdot wH_2O$$

The structural formula may be assigned as:

$$[4Al(OH)_3 \cdot 2Mg(OH)_2 \cdot MgCl_2]_{50\%} \cdot [4Al(O)_3 \cdot 2Mg(OH)_2 \cdot Mg(OH)_2]_{50\%} \cdot w'H_2O$$

The atomic ratio of aluminum to magnesium was found to be 1.30 (theory 1.33).

(B) Magnesium sulfate complex of double hydroxides of aluminum and magnesium.—158 gm. of aluminum sulfate, $Al_2(SO_4)_3 \cdot 16H_2O$, were dissolved in 0.5 liter of water (0.25 mole). The aluminum sulfate solution was then slowly added to 1.5 liter of sodium hydroxide solution, in which 80 gm. of sodium hyrdroxide (2 moles) were dissolved. The aluminate solution was filtered and allowed to cool down to room temperature, 25–30° C. The pH of the aluminate solution was around 11.2. To the aluminate solution, 0.35 liter of magnesium sulfate solution was slowly and continuously added with mixing (magnesium sulfate solution was made of 87 gm. of magnesium sulfate heptahydrate, $MgSO_4 \cdot 7H_2O$, in 0.35 liter of water). The final pH of the reaction system was 8.6. The product was filtered and washed three times each with approximately two liters of water. Semi-transparent substance was obtained after drying. The product has the following unique composition:

$$7Al_2O_3 \cdot 11MgO \cdot 3SO_3 \cdot yH_2O$$

The structural formula may be assigned as:

$$[4Al(OH)_3 \cdot 2Mg(OH)_2 \cdot Mg(SO_4)]_{84.7\%} \cdot [4Al(OH)_3 \cdot 2Mg(OH)_2 \cdot Mg(OH)_2]_{15.3\%} \cdot y'H_2O$$

The atomic ratio of aluminum to magnesium was found to be 1.31 (theory 1.33).

(C) Magnesium nitrate complex of double hydroxides of aluminum and magnesium.—188 gm. of aluminum nitrate, $Al(NO_3)_3 \cdot 9H_2O$, (0.5 mole) was dissolved in 0.5 liter of water. The aluminate solution was then added slowly to 1.5 liter of sodium hydroxide solution, in which 80 gm. of sodium hydroxide (2 moles) were dissolved. The aluminate solution was filtered and allowed to cool down to room temperature, 25–30° C. The pH of the aluminate solution was around 11.2. To the aluminate solution, 0.35 liter of magnesium nitrate solution was slowly and continuously added with mixing (magnesium nitrate solution was made of 89.8 gm. of $$Mg(NO_3)_2 \cdot 6H_2O$$

in 0.35 liter of water). The final pH of the reaction system was 8.6. The product was filtered and washed three times each with approximately two liters of water. Semi-transparent substance was obtained after drying. The product has the following unique composition:

$$10Al_2O_3 \cdot 15MgO \cdot 2NO_2 \cdot vH_2O$$

The structural formula may be assigned as:

$$[4Al(OH)_3 \cdot 2Mg(OH)_2 \cdot Mg(NO_3)_2]_{20\%} \cdot [4Al(OH)_3 \cdot 3Mg(OH)_2]_{80\%}$$

EXAMPLE 2

Addition of solution of magnesium salt to sodium aluminate solution containing anion other than the anion common to magnesium salt Magnesium salicylate complex of double hydroxides of aluminum and magnesium.—121 gm. of aluminum chloride, $AlCl_3 \cdot 6H_2O$ (0.5 mole) was dissolved in 0.5 liter of water. The aluminum solution was then added slowly to 1.5 liter of sodium hydroxide solution, in which 80 gm. of sodium hydroxide (2 moles) were dissolved. The aluminate solution was filtered and allowed to cool down to room temperature, 25–30° C. (In practice filtration of sodium aluminate solution may not be necessary.) The pH of the aluminate solution was around 11.2. To the aluminate solution, 16 gm. (0.1 mole) of sodium salicylate were added and followed by the addition of 0.35 liter of magnesium chloride solution (magnesium chloride solution was mae of 71 gm. of magnesium hexahydrate in 0.35 liter of water). The final pH of the reaction system was 8.6. The product was filtered and washed three times each with approximately two liters of water. Semi-transparent substance was obtained after drying. The product has the following unique composition:

$$13Al_2O_3 \cdot 19MgO \cdot 5C_6H_5(OH)CO_2 \cdot xH_2O$$

The structural formula may be assigned as:

$$[4Al(OH)_3 \cdot 2Mg(OH)_2 \cdot Mg(C_6H_5(OH)CO_2)_2]_{37.5\%} \cdot$$
$$[4Al(OH)_3 \cdot 2Mg(OH)_2 \cdot Mg(OH)_2]_{62.5\%} x'H_2O$$

The atomic ratio of aluminum to mangesium was found to be 1.34 (theory 1.33).

EXAMPLE 3

Replacement of chloride by polyvalent anion in a watery suspension of magnesium chloride complex of double hydroxides of aluminum and magnesium Magnesium carbonate complex of double hydroxide of aluminum and magnesium.—121 gm. of aluminum chloride, $AlCl_3 \cdot 6H_2O$ (0.5 mole) was dissolved in 0.5 liter of water. The aluminum solution was then added slowly to 1.5 liter of sodium hydroxide solution, in which 80 gm. of sodium hydroxide (2 moles) were dissolved. The aluminate solution was filtered and allowed to cool down to room temperature, 25–30° C. (In practice filtration of sodium aluminate solution may not be necessary.) The pH of the aluminate solution was around 11.2. To the aluminate solution, 0.35 liter of magnesium chloride solution was slowly and continuously added with mixing (magnesium chloride solution was made of 71 gm. of magnesium chloride hexahydrate in 0.35 liter of water). The final pH of the reaction system was 8.6. The product was filtered and suspended in two liters of sodium carbonate solution, which was made by dissolving 12.4 gm. of sodium carbonate monohydrate in two liters of water. The product was mixed for a period of five to ten minutes and filtered and washed three times each with approximately two liters of water. Semi-transparent substance was obtained after drying. The product has the following unique composition:

$$9Al_2O_3 \cdot 14MgO \cdot 3CO_2 \cdot wH_2O$$

The structural formula may be assigned as:

$$[4Al(OH)_3 \cdot 2Mg(OH)_2 \cdot MgCO_3]_{66.7\%} \cdot$$
$$[4Al(OH)_3 \cdot 2Mg(OH)_2 \cdot Mg(OH)_2]_{33.3\%} w'H_2O$$

The atomic ratio of aluminum to magnesium was found to be 1.27 (theory 1.33).

It is understood that the foregoing detailed description is given merely by way of illustration and that many variations may be made therein without departing from the spirit of our invention.

Having described our invention, what we desire to secure by Letters Patent is:

1. A complex of the formula:

$$[2Al(OH)_3 \cdot M(OH)_2]_n \cdot [xM(OH)_2 \cdot yMA]_{n-1}$$

wherein M is a bivalent metal cation selected from the group consisting of magnesium, cobalt, and copper; $n$ is the degree of polymerization; $x$ and $y$ are moles of anion complexing with the bivalent metal cation; $x+y=1$; and A is an anion selected from the group consisting of chloride, sulfate, nitrate, carbonate, and salicylate.

2. A complex of claim 1 which may be represented by:

$$[2Al(OH)_3 \cdot Mg(OH)_2]_2 \cdot [0.5Mg(OH)_2 \cdot 0.5MgCl_2]$$

3. A complex of claim 1 which may be represented by:

$$[2Al(OH)_3 \cdot Mg(OH)_2]_2 \cdot [0.15Mg(OH)_2 \cdot 0.85MgSO_4]$$

4. A complex of claim 1 which may be represented by:

$$[2Al(OH)_3 \cdot Mg(OH)_2]_2 \cdot$$
$$[0.63Mg(OH)_2 \cdot 0.37Mg(C_6HH_4(OH)CO_2)_2]$$

5. A complex of claim 1 which may be represented by:

$$[2Al(OH)_3 \cdot Mg(OH)_2]_2 \cdot [0.33Mg(OH)_2 \cdot 0.67MgCO_3]$$

6. A complex of claim 1 which may be represented by:

$$[2Al(OH)_3 \cdot Mg(OH)_2]_2 \cdot [0.80Mg(OH)_2 \cdot 0.20MgNO_3]$$

7. A complex of claim 1 which may be represented by $$[2Al(OH)_3 \cdot Co(OH)_2]_2 \cdot [0.25Co(OH)_2 \cdot 0.75CoCl_2]$$

8. A complex of claim 1 which may be represented by:

$$[2Al(OH)_3 \cdot Cu(OH)_2]_{50} \cdot [0.20Cu(OH)_2 \cdot 0.80CuSO_4]_{49}$$

References Cited

UNITED STATES PATENTS 1,998,750   4/1935   Bruson et al. _____ 260—429.9
3,347,641  10/1967   Higuchi et al. _____ 23—315

OSCAR R. VERTIZ, Primary Examiner

H. S. MILLER, Assistant Examiner

U.S. Cl. X.R.

260—438, 439; 424—131, 143, 154, 157, 230